US012470106B2

(12) United States Patent
Walter et al.

(10) Patent No.: US 12,470,106 B2
(45) Date of Patent: Nov. 11, 2025

(54) SWITCHING DISK FOR CONTACTING WINDINGS WITH A PRINTED CIRCUIT BOARD

(71) Applicant: ebm-papst Mulfingen GmbH & Co. KG, Mulfingen (DE)

(72) Inventors: Manuel Walter, Schwaebisch Hall (DE); Tobias Letter, Bad Mergentheim (DE); Madlene Schmidt, Igersheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 238 days.

(21) Appl. No.: 18/213,948

(22) Filed: Jun. 26, 2023

(65) Prior Publication Data

US 2023/0421012 A1    Dec. 28, 2023

(30) Foreign Application Priority Data

Jun. 24, 2022  (DE) .......................... 102022115852.7

(51) Int. Cl.
*H02K 3/52* (2006.01)
*H01R 12/55* (2011.01)
*H02K 3/28* (2006.01)

(52) U.S. Cl.
CPC ............. *H02K 3/522* (2013.01); *H01R 12/55* (2013.01); *H02K 3/28* (2013.01); *H02K 2203/09* (2013.01)

(58) Field of Classification Search
CPC ......... H02K 3/38; H02K 3/50; H02K 2203/09
USPC .......................................................... 310/71
See application file for complete search history.

(56) References Cited

U.S. PATENT DOCUMENTS

| 2016/0190887 | A1  | 6/2016  | Sambuichi et al. |
| 2021/0305870 | A1* | 9/2021  | Takahashi ................ H02K 5/08 |
| 2021/0351637 | A1* | 11/2021 | Chung .................... H02K 1/146 |
| 2024/0305146 | A1* | 9/2024  | Zuo ........................ H02K 1/148 |

FOREIGN PATENT DOCUMENTS

| DE | 102010039335 A1 | 2/2012 |
| DE | 102013105571 A1 | 12/2014 |
| DE | 102015201314 A1 | 7/2016 |

(Continued)

OTHER PUBLICATIONS

German Search Report dated Mar. 29, 2029.
German Search Report dated Nov. 22, 2023.

*Primary Examiner* — Oluseye Iwarere
*Assistant Examiner* — Minki Chang
(74) *Attorney, Agent, or Firm* — Dickinson Wright PLLC

(57) ABSTRACT

A switching disk for contacting windings of a stator of an electric motor, which windings are arranged around an axis of rotation, with a printed circuit board of the electric motor, wherein the switching disk has an annular support structure circumferentially extending around the axis of rotation and multiple contact arrangements for contacting the windings with the printed circuit board, which are held by the support structure. The contact arrangements are each formed by a winding contact for contacting one of the windings, a printed circuit board contact offset therefrom in the radial direction for contacting the printed circuit board, and a coupling element extending in the radial direction and electrically connecting the winding contact to the printed circuit board contact.

13 Claims, 2 Drawing Sheets

(56) References Cited

FOREIGN PATENT DOCUMENTS

| | | |
|---|---|---|
| DE | 102016226200 A1 | 6/2018 |
| DE | 102019205121 A1 | 10/2020 |
| DE | 214124985 U | 9/2021 |
| WO | 2018162620 A1 | 9/2018 |

* cited by examiner

SWITCHING DISK FOR CONTACTING WINDINGS WITH A PRINTED CIRCUIT BOARD

RELATED APPLICATIONS

This application claims priority to German Patent Application No. 10 2022 115 852.7, filed Jun. 24, 2022, the entire contents of which is incorporated herein by reference in its entirety.

FIELD

The disclosure relates to a switching disk for contacting windings of a stator of an electric motor, which windings are arranged about an axis of rotation, with a printed circuit board of the electric motor, a stator unit consisting of a stator and a switching disk, and an electric motor having such a switching disk or such a stator unit.

BACKGROUND

A variety of different electric motors are known from the prior art, which often provide a switching disk for electrical contacting of the windings or the phase windings of the stator with a printed circuit board or electronics arranged thereon.

For this purpose, the switching disk usually has contacts which extend exclusively in the axial direction on a single predetermined pitch circle and are connected at a first axial end to the printed circuit board and at the second axial end to a winding or a winding phase.

For stators with different diameters, switching disks and printed circuit boards adapted thereto must be provided in each case, so that the printed circuit board can thus be contacted with the stator or windings. Although the electronics installed on the printed circuit boards are often the same for different types of stators, a specific type of printed circuit board must be provided in each case due to the different stator diameters, which results in increased production costs.

BRIEF SUMMARY

It is therefore an object of the disclosure to overcome the aforementioned disadvantages and to provide a switching disk for contacting windings of a stator of an electric motor, which windings are arranged about an axis of rotation, with a printed circuit board of the electric motor, by means of which switching disk a printed circuit board or a type of a printed circuit board can be contacted with different types of stators or with stators of different diameters.

This object is achieved by the combination of features according to the independent claims.

According to the disclosure, a switching disk for contacting windings of a stator of an electric motor arranged around an axis of rotation with a printed circuit board of the electric motor is therefore proposed. The switching disk has an annular support structure circumferentially extending about the axis of rotation and multiple contact arrangements for contacting the windings with the printed circuit board, which are held by the support structure. Furthermore, the contact arrangements are each formed by a winding contact for contacting one of the windings, a printed circuit board contact offset thereto in the radial direction for contacting the printed circuit board, and a coupling element extending in the radial direction and electrically connecting the winding contact to the printed circuit board contact.

A fundamental idea of the disclosure is that the switching disk forms an adapter between a uniform type of printed circuit board for different types of stators, which differ in particular in their diameter. Accordingly, it is not necessary for different stator units or electric motors to be provided with both a switching disk adapted thereto and a printed circuit board adapted thereto, but only with a switching disk adapted to the stator.

In other words, by relocating the printed circuit board contacts to a pitch diameter that is, in particular, smaller than the winding contacts that form the actual stator contacting, the position of printed circuit board contacts can be standardized. For this purpose, a contact arrangement with an angled shape is used, with the coupling elements compensating for the radial offset resulting from the different pitch diameters. The contact arrangements, which are fixed in the support structure, establish the contact between a winding or a phase winding and the printed circuit board.

An advantageous refinement of the switching disk provides that the winding contact and the printed circuit board contact of the contact arrangements are each formed as two separate parts. This allows them to be arranged and fixed separately from one another in or on the support structure. Furthermore, at least one of the contacts can also be used for different types of stators in the case of different switching disks.

Furthermore, a variant is advantageous in which the coupling elements are each formed integrally and/or in one piece with the respective winding contact or the respective printed circuit board contact.

In addition, the support structure can have a respective receiving space for each of the contact arrangements, in which the respective winding contact, the respective printed circuit board contact and the respective coupling element can be arranged and, in particular, held in a detachable manner. Due to the detachable holding in the receiving space, a pre-assembly can be implemented, wherein, as part of a possibly following final assembly, the components can be finally fixed in the receiving space or on the support structure.

To arrange the contact arrangement in the receiving space, furthermore, the latter is preferably open in the axial direction. A variant in which the receiving space is open to a side facing the stator in an assembled state of the switching disk is particularly advantageous.

Moreover, the receiving space, the winding contact, the printed circuit board contact and the coupling element are preferably designed to correspond to one another, and the winding contact, the printed circuit board contact and the coupling element can be plugged into the receiving space in the axial direction.

In order to hold at least individual components of the contact arrangement, i.e. in particular the winding contact, the printed circuit board contact and the coupling element, in the receiving space, it can also be provided that the switching disk further has a fastening element which is in particular arranged in the receiving space and, furthermore, is in particular designed as a latching hook. The fastening element is designed to hold the winding contact and/or the printed circuit board contact and/or the coupling element in the receiving space and/or generally on the support structure. In doing so, it is also possible to provide multiple fastening elements for one component of the contact arrangement or at least one fastening element for different components of the contact arrangement.

The printed circuit board contact can also penetrate the support structure in the axial direction at a passage point. Preferably, it is provided here that the support structure at the passage point forms a press-fit extension which extends in the axial direction and which can be press-fitted around the printed circuit board contact to fix and seal the printed circuit board contact.

In addition, the winding contact and/or the printed circuit board contact and/or the coupling element can be designed as a stamped and bent part.

For contacting the coupling with the winding contact or the printed circuit board contact, in a further variant of the switching disk, the coupling element has a first connecting portion which runs in a first plane running in the radial direction. Correspondingly, the winding contact or the printed circuit board contact has a second connecting portion which runs in a second plane orthogonal thereto. The first connecting portion and the second connecting portion can be plugged into one another in an intersecting manner, for example, through a slit in at least one of the connecting portions.

For contacting with the windings, the winding contacts can furthermore each have insulation displacement contacts or, in particular, can be designed as such on the winding side.

Due to the radial offset between the printed circuit board contact and the winding contact, or due to the different pitch diameters on which the printed circuit board contact and the winding contact lie, it can happen that the printed circuit board contact in particular has to be sealed unsupported during a subsequent pressing of the stator, since the printed circuit board contact cannot be supported on the winding contact as is often the case. To overcome this problem, an advantageous variant provides that the support structure has a radially outer support structure and a radially inner support structure, at least one of which is designed to extend circumferentially about the axis of rotation, in particular in an annular manner. The radially outer support structure and/or the radially inner support structure are designed to support the support structure on a first side on the stator against a force acting from the opposite side in the axial direction. This force can occur in particular during sealing and/or pressing of the press-fit extension around the printed circuit board contact.

The radially outer support structure and the radially inner support structure can be connected by webs extending in the radial direction, wherein the radially outer support structure and/or the radially inner support structure additionally comprise stiffening projections extending in the radial direction.

Another aspect of the disclosure relates to a stator unit consisting of a stator and a switching disk according to the disclosure having a radially inner support structure and a radially outer support structure. The stator includes a plurality of stator teeth, which are each wound with a winding. Furthermore, the stator teeth are enclosed by an encapsulation on which the windings are arranged or wound. The radially outer support structure rests radially on the outside on the encapsulation and the radially inner support structure rests radially on the inside on the encapsulation.

It can also be provided here that the encapsulation has a laying channel extending in the circumferential direction radially on the inside for receiving a wire which forms the windings and in particular connects the windings to one another which belong to a phase winding. A circumferentially extending wall of the laying channel forms a bearing surface in the axial direction for supporting the radially inner support structure.

In addition or as an alternative to such a laying channel, the encapsulation can form radially inner webs extending radially outwards, each of which forms a further bearing surface in the axial direction for supporting the radially inner support structure.

For example, it can be provided that the laying channel extends in the circumferential direction only in sections and not completely around the axis of rotation, and in the remaining section, in which no laying channel extends, a plurality of webs extending radially outwards are formed by the encapsulation. Together, the laying channel and the webs then provide bearing surfaces for supporting the radially inner support structure.

Furthermore, one aspect of the disclosure relates to an electric motor having a stator unit according to the disclosure and/or a switching disk according to the disclosure.

In addition to the switching disk per se, one aspect of the disclosure further relates to a system consisting of one type of printed circuit board and a plurality of types of stator units and/or a plurality of types of switching disks according to the disclosure. What is essential is that the type of circuit board has contacts or connection points for contacting the types of switching disks on a first pitch circle having a first diameter, and the different types of switching disks each have the circuit board contacts for contacting the contacts of the circuit board on the first pitch circle and the winding contacts for contacting the windings or the connection points of the windings on a second pitch circle. In this case, the diameter of the second pitch circle differs from type to type of switching disks or from type to type of stator, so that the switching disk forms an adapter between a single type of printed circuit board and different types of stators differing in particular in their diameter.

The features disclosed above can be combined as desired, insofar as this is technically possible and they do not contradict each other.

BRIEF DESCRIPTION OF THE DRAWINGS

Other advantageous refinements of the disclosure are characterized in the subclaims or are illustrated in more detail below together with the description of the preferred embodiment of the disclosure with reference to the figures. In the figures:

DETAILED DESCRIPTION

The figures are schematic by way of example. Identical reference signs in the figures indicate identical functional and/or structural features.

Figure 1:
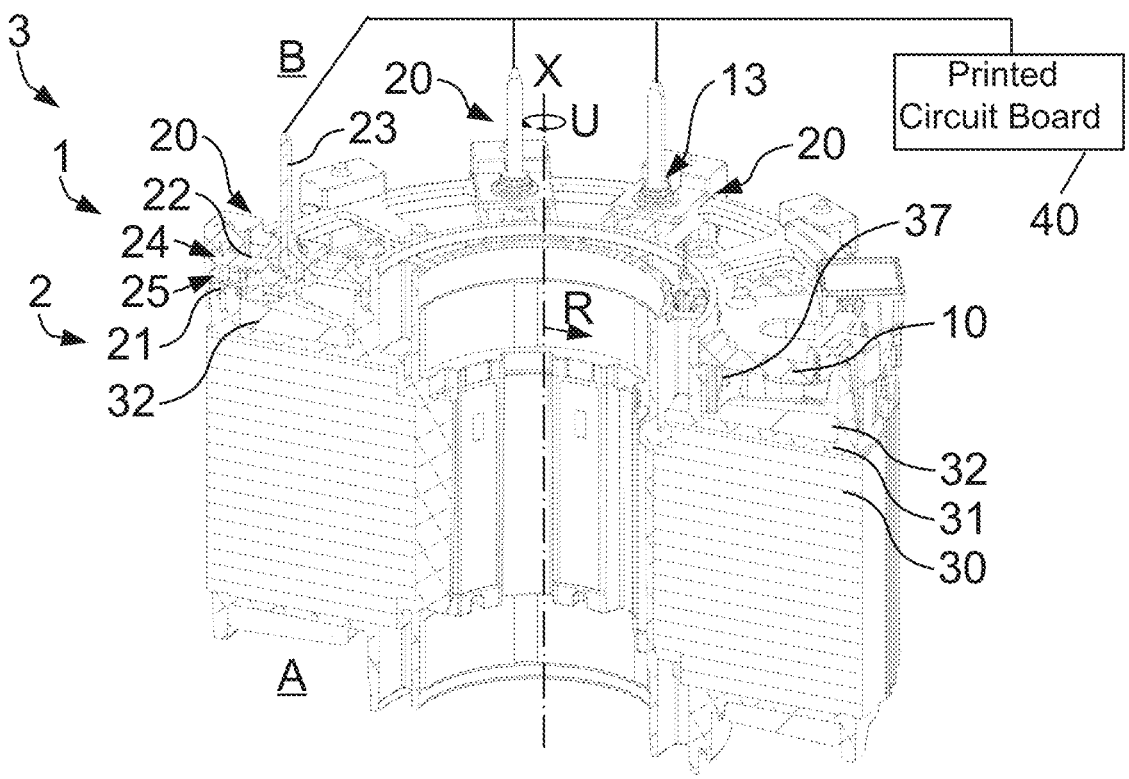
FIG. 1 shows a longitudinal section through a stator unit.
Figure 2:
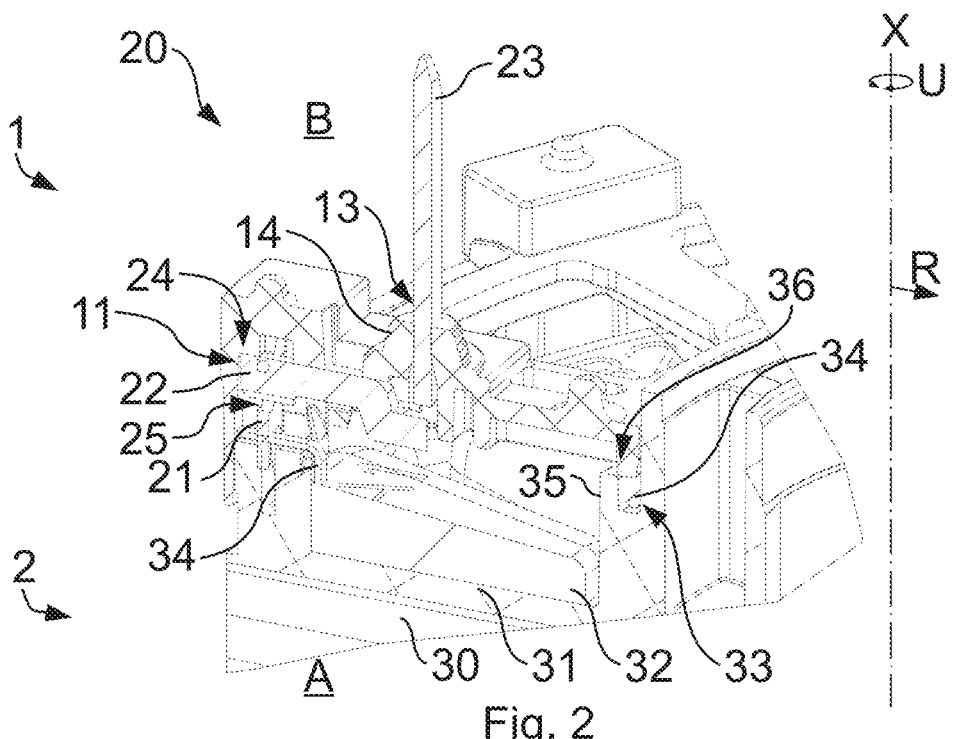
FIG. 2 shows a detailed view of the stator unit.
Figure 3:
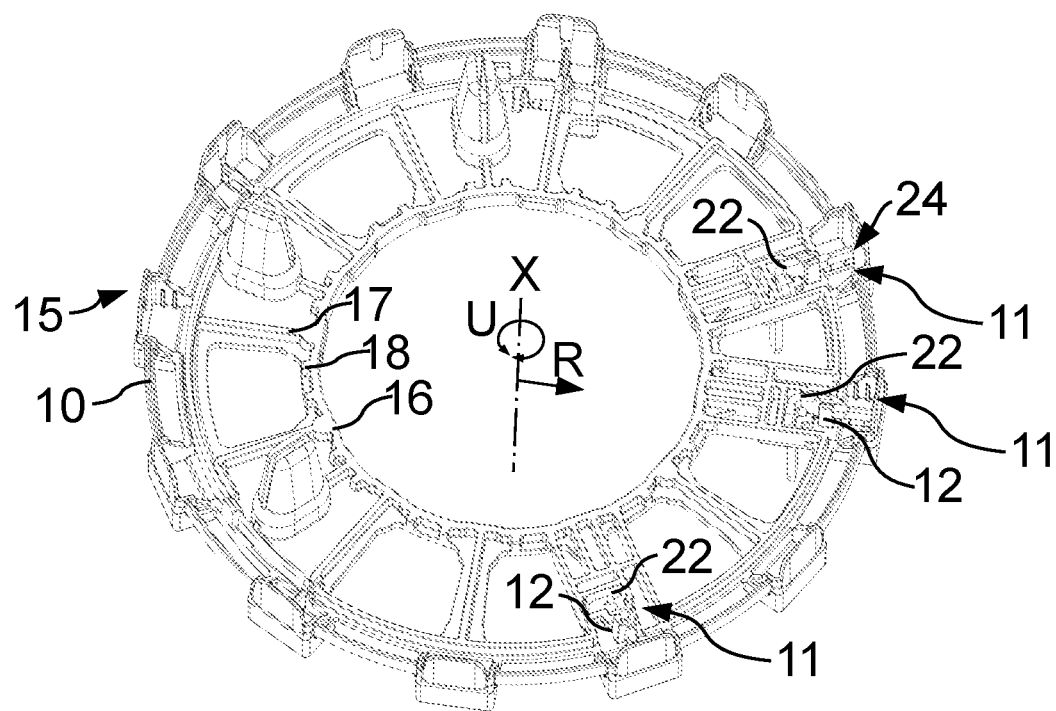
FIG. 3 shows a perspective illustration of a switching disk.
Figure 4:
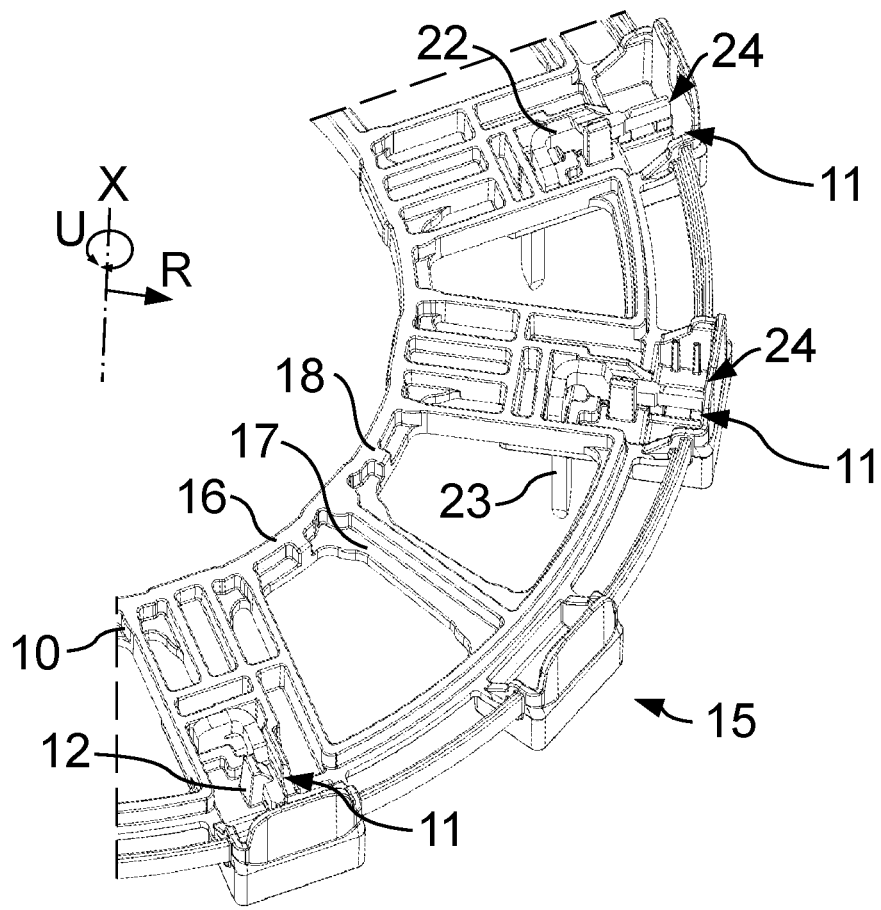
FIG. 4 shows a detailed view of the switching disk.

The switching disk 1 shown in FIGS. 3 and 4 can in particular be the switching disk 1 of the stator unit 3 according to FIGS. 1 and 2, so that the description applies analogously.

The stator unit 3 shown in longitudinal section in FIG. 1 is the stator unit 3 of an external rotor motor with a stator 2 and a switching disk 1 arranged thereon in the axial direction, i.e. along the axis of rotation X. The stator 2 has a plurality of stator teeth 30 which are arranged in the circumferential direction U about the axis of rotation X and extend in the radial direction R and are surrounded by an encapsulation 31. The encapsulation 31 can be produced in particular by overmolding the stator teeth 30 or the stator pack forming the stator teeth 30. Windings 32 formed by one wire 34 or multiple wires 34 are arranged on the stator teeth 30 covered by the encapsulation 31. In particular, multiple windings 32 belong to a phase winding, the windings 32 of which are connected by the wire 34.

Each phase winding requires contacting with the printed circuit board 40, so that one contact arrangement 20 and, in the present case, correspondingly three contact arrangements 20 are provided for each phase winding, wherein the section runs through one of the contact arrangements 20.

Different types of stators 2 can differ in their diameter or radius, in the number of stator teeth 30 and the windings 32 arranged thereon, but also in the number of phase windings and the correspondingly required contact arrangements 20.

In order not to have to provide a separate type of printed circuit board in each case for different types of stators 2, which in particular must be designed analog to the stator 2 with respect to the diameter, a switching disk 1 is provided which compensates for a radial offset between connection points of a uniform printed circuit board, i.e. one type of printed circuit board, and connection points of the windings 32 of the respective type of stator 2.

In the embodiment illustrated in the figures, the connection points of the windings 32 of the stator 2 formed by the wire 34 are located in the radial direction R, i.e. radially outside the connection points provided by the uniform type of printed circuit board.

In order to compensate for this offset, the switching disk 1 has a contact arrangement 20 for each connection point of the stator 2, i.e. for each phase winding, and here specifically three contact arrangements 20, which are each formed by a winding contact 21 for connection to a winding 32, a printed circuit board contact 23 for connection to the printed circuit board, and a coupling element 22.

The connection points of the stator 2, i.e., the connection points of the windings 32 formed by wires 34 lie on a first radius, the connection points of the printed circuit board lie on a second radius smaller compared thereto. Accordingly, the winding contacts 21 are arranged on the first radius and the printed circuit board contacts 23 are arranged on the second radius, wherein the radii can also be specified as diameters or pitch circle diameters.

The coupling element 22 is designed in each case to compensate for the offset in the radial direction R between the first radius and the second radius, so that it extends in the radial direction R and electrically connects the respective winding contact 21 to the respective printed circuit board contact 23.

In the variant illustrated in the present case, the coupling element 22 is formed integrally in each case, i.e. in one piece and as one part with the printed circuit board contact 23, which is apparent in particular from a synopsis of the figures and is clearly evident in FIG. 4.

The coupling element 22 and the printed circuit board contact 23 are also provided as an angled stamped and bent part.

The contact arrangements 20 are held on a support structure 10 of the switching disk 1, which in the present case is formed in particular from a radially inner support structure 16 and a radially outer support structure 15, which are connected to one another by webs 17 running in the radial direction R.

The support structure 10 forms a receiving space 11 for each contact arrangement 20, which is open in the axial direction towards a first side A which faces the stator 2 in the assembled state shown in FIG. 1, and closed towards an opposite second side B, which faces away from the stator 2.

The coupling element 22 is arranged in this receiving space 11 and is held therein by a fastening element 12 designed as a latching hook 12, so that the coupling element 22 thus latches with the latching hook 12 when inserted in the axial direction into the receiving space 11.

In doing so, the printed circuit board contact 23, which extends in the axial direction, passes through the support structure 10 or the receiving space 11 from the first side A to the second side B and emerges from the support structure 10 at the second side B in each case at a respective passage point 13.

For sealing the printed circuit board contact 23 with respect to the support structure 10 and for further or final fixing of the printed circuit board contact 23 to the supporting structure 10, a respective press-fit extension 14 is provided at the passage point 13, which can be press-fitted onto the printed circuit board contact 23 by application of force.

For electrical contacting of the windings 32 or their connection points which are formed by a wire 34 of the windings 32, as shown in particular in FIG. 2, the winding contacts 21 are designed as insulation displacement contacts. Furthermore, the winding contacts 21 can be plugged onto the respective coupling element 22 in the axial direction for electrical contacting with the latter.

For this purpose, the coupling element 22 has a blade-like connecting portion 24 onto which the respective winding contact 21 can be plugged with a connecting portion 25 which corresponds thereto and is slotted.

In addition, a recess which at least partially extends through the coupling element 22 in the circumferential direction U can be formed in the connecting portion 24 of the coupling element 22. The winding contact 21 can then form a projection or a latching hook for this purpose, which engages in the recess so that the winding contact 21 can thereby be fixed to the coupling element 22.

In the case of conventional switching disks, in which the winding contact and the printed circuit board contact are formed together as a rod running in the axial direction, a force occurring during sealing at the press-fit extension can be supported directly on the winding contact or on the outer circumference of the support structure.

Deviating from this, the switching disk 1 according to the disclosure in the variant illustrated has the radially outer support structure 15 on the radially outer circumference of the support structure 10 and the radially inner support structure 16 on the radially inner circumference of the support structure 10 to support against such forces. Furthermore, stiffening projections 18 are formed on the radially inner support structure 16, which extend outwards in the radial direction R and additionally stiffen the support structure 10.

The forces occur in particular in a state in which the switching disk 1 is arranged on the stator 2, so that the stator 2 preferably has corresponding bearing surfaces on which the radially inner support structure 16 and the radially outer support structure 15 can rest.

The stator 2 provides a laying channel 33 at its radially inner portion, in which the wire 34 of a phase winding can be guided from winding 32 to winding 32. In this case, the circumferential wall 35 of the laying channel 33, which extends in the circumferential direction U, protrudes in the axial direction beyond the wire 34 that can be arranged in the laying channel 33 and forms a bearing surface 36 on which the radially inner support structure 16 can rest.

However, as shown in particular in FIG. 1, the laying channel 33 does not extend completely about the axis of rotation R in the circumferential direction U. However, in order to allow the radially inner support structure 16 to rest stably on the encapsulation 31, the latter forms webs 37 in the portion in which no laying channel 33 is provided, which webs run from radially inwards to radially outwards and additionally stiffen the encapsulation 31, each of which provides a bearing surface in the axial direction for supporting the radially inner support structure 37.

The disclosure is not limited in its embodiment to the preferred exemplary embodiments indicated above. Rather, a number of variants is conceivable which also make use of the presented solution in fundamentally different embodiments.

The invention claimed is:

1. A switching disk for contacting windings of a stator of an electric motor, which windings are arranged around an axis of rotation, with a printed circuit board of the electric motor,
   wherein the switching disk has an annular support structure circumferentially extending around the axis of rotation and multiple contact arrangements for contacting the windings with the printed circuit board, which are held by the support structure,
   wherein the contact arrangements are each formed by a winding contact for contacting one of the windings, a printed circuit board contact offset therefrom in the radial direction for contacting the printed circuit board, and a coupling element extending in the radial direction and electrically connecting the winding contact to the printed circuit board contact; and
   wherein, for each of the contact arrangements, the support structure has a respective receiving space in which the respective winding contact, the respective printed circuit board contact and the respective coupling element are held, in particular in a detachable manner, and a fastening element is arranged in the receiving space, the fastening element designed as a latching hook configured to hold the winding contact and/or the printed circuit board contact and/or the coupling element in the receiving space.

2. The switching disk according to claim 1,
   wherein the winding contact and the printed circuit board contact of the contact arrangements are each formed as two parts separate from one another.

3. The switching disk according to claim 1,
   wherein the coupling element is in each case formed integrally and/or in one piece with the respective winding contact or the respective printed circuit board contact.

4. The switching disk according to claim 1,
   wherein the receiving space is open in the axial direction.

5. The switching disk according to claim 4,
   wherein the receiving space, the winding contact, the printed circuit board contact and the coupling element are designed to correspond to one another, and the winding contact, the printed circuit board contact and the coupling element can be plugged into the receiving space in the axial direction.

6. The switching disk according to claim 1,
   wherein the printed circuit board contact penetrates the support structure at a passage point in the axial direction,
   wherein, at the passage point, the support structure forms a press-fit extension extending in the axial direction, which can be press-fitted around the printed circuit board contact for fixing and sealing the printed circuit board contact.

7. The switching disk according to claim 1,
   wherein the winding contact and/or the printed circuit board contact and/or the coupling element is/are designed as a stamped and bent part.

8. The switching disk according to claim 1,
   wherein the coupling element has a first connecting portion which extends in a first plane extending in the radial direction,
   wherein the winding contact or the printed circuit board contact has a second connecting portion corresponding thereto, which extends in a second plane orthogonal thereto,
   and wherein the first connecting portion and the second connecting portion can be plugged into one another in an intersecting manner.

9. The switching disk according to claim 1,
   wherein the support structure has a radially outer support structure and a radially inner support structure, at least one of which is designed so as to circumferentially extend around the axis of rotation, in particular in an annular manner,
   wherein the radially outer support structure and/or the radially inner support structure are designed to support the support structure on a first side on the stator against a force acting from the opposite side in the axial direction.

10. The switching disk according to claim 9,
    wherein the radially outer support structure and the radially inner support structure are connected by webs extending in the radial direction, and wherein the radially outer support structure and/or the radially inner support structure have stiffening projections extending in the radial direction.

11. A stator unit consisting of the stator and the switching disk according to claim 9,
    wherein the stator has a plurality of stator teeth, each of which is wound with a winding,
    wherein the stator teeth are enclosed by an encapsulation on which the windings are wound,
    wherein the radially outer support structure rests radially on the outside on the encapsulation and wherein the radially inner support structure rests radially on the inside on the encapsulation.

12. The stator unit according to claim 11,
    wherein the encapsulation has laying channel which extends in the circumferential direction radially on the inside for receiving a wire which forms the windings, and whose wall, which extends in the circumferential direction, forms a bearing surface in the axial direction for supporting the radially inner support structure,
    and/or wherein radially on the inside, the encapsulation forms webs extending radially outwards, which webs each form a further bearing surface in the axial direction for supporting the radially inner support structure.

13. A system consisting of one type of printed circuit board and a plurality of types of switching disks according to claim 1, wherein the type of printed circuit board has contacts for contacting the types of switching disks on a first pitch circle having a first diameter, wherein the types of switching disks each have the printed circuit board contacts for contacting the contacts of the printed circuit board on the first pitch circle and the winding contacts for contacting the windings on a second pitch circle which has a second diameter which is different from type to type of switching disks, in particular different from the first diameter.

\* \* \* \* \*